US012117773B2

(12) United States Patent
Kahrobaiyan

(10) Patent No.: US 12,117,773 B2
(45) Date of Patent: Oct. 15, 2024

(54) TIMEPIECE RESONATOR MECHANISM PROVIDED WITH A TRANSLATION TABLE

(71) Applicant: The Swatch Group Research and Development Ltd, Marin (CH)

(72) Inventor: Mohammad Hussein Kahrobaiyan, Neuchâtel (CH)

(73) Assignee: The Swatch Group Research and Development Ltd, Marin (CH)

(*) Notice: Subject to any disclaimer, the term of this patent is extended or adjusted under 35 U.S.C. 154(b) by 375 days.

(21) Appl. No.: 17/525,329

(22) Filed: Nov. 12, 2021

(65) Prior Publication Data

US 2022/0187768 A1 Jun. 16, 2022

(30) Foreign Application Priority Data

Dec. 14, 2020 (EP) .................................... 20213737

(51) Int. Cl.
*G04B 17/04* (2006.01)
*G04B 17/10* (2006.01)

(52) U.S. Cl.
CPC ........... *G04B 17/045* (2013.01); *G04B 17/10* (2013.01)

(58) Field of Classification Search
CPC ...... G04B 17/045; G04B 17/10; G04B 17/28; G04B 17/02; G04B 33/00
See application file for complete search history.

(56) References Cited

U.S. PATENT DOCUMENTS

| | | | |
|---|---|---|---|
| 2017/0010586 A1 | 1/2017 | Di Domenico et al. | |
| 2018/0136609 A1 | 5/2018 | Winkler et al. | |
| 2019/0120287 A1* | 4/2019 | Cosandier ............. | B64G 1/222 |
| 2020/0033805 A1 | 1/2020 | Di Domenico et al. | |

FOREIGN PATENT DOCUMENTS

| | | |
|---|---|---|
| CN | 108073065 A | 5/2018 |
| EP | 3 324 247 A1 | 5/2018 |
| EP | 3 476 748 A1 | 5/2019 |
| EP | 3 561 607 A1 | 10/2019 |
| JP | 2018-81094 A | 5/2018 |

OTHER PUBLICATIONS

European Search Report for 20 21 3737 dated, May 18, 2021.

* cited by examiner

*Primary Examiner* — Edwin A. Leon
*Assistant Examiner* — Sean R Brannon
(74) *Attorney, Agent, or Firm* — Sughrue Mion, PLLC

(57) ABSTRACT

The invention relates to a rotary resonator mechanism (1) comprising an oscillating mass (2), a flexible guide comprising at least two flexible blades (4) connecting a stationary support (3) to the oscillating mass (2), the resonator mechanism (1) extending substantially in the same plane to allow the oscillating mass to perform a rotary movement around a virtual pivot, the flexible guide (1) extending along a main axis of symmetry (14), characterised in that the mechanism (1) comprises a translation table (5) arranged between the flexible guide and the oscillating mass (2), the translation table (5) being joined to the flexible blades (4) and/or to the oscillating mass (2).
The invention also relates to a horological movement comprising such a resonator (1).

8 Claims, 3 Drawing Sheets

TIMEPIECE RESONATOR MECHANISM PROVIDED WITH A TRANSLATION TABLE

CROSS-REFERENCE TO RELATED APPLICATIONS

This application claims priority to European Patent Application No. 20213737.8 filed Dec. 14, 2020, the entire contents of which are incorporated herein by reference.

TECHNICAL FIELD OF THE INVENTION

The invention relates to a timepiece resonator mechanism, the mechanism being provided with a translation table.

TECHNOLOGICAL BACKGROUND

Most current mechanical watches are provided with a spring balance and a Swiss lever escapement mechanism. The spring balance forms the time base of the watch. It is also called a resonator.

The escapement, in turn, fulfils two main functions:

maintaining the reciprocating movements of the resonator;

counting these reciprocating movements.

To constitute a mechanical resonator, an inertial element, a guide and an elastic return element are needed. Conventionally, a spiral spring acts as an elastic return element for the inertial element constituted by a balance. This balance is guided in rotation by pivots, which rotate in plain ruby bearings.

Flexible guides are used today as a spring to form a virtual pivot. The flexible virtual pivot guides significantly improve timepiece resonators. The simplest are pivots with crossed blades, made up of two guide devices with straight blades which cross each other, generally perpendicularly. These two blades can be either three-dimensional in two different planes, or two-dimensional in the same plane and are then as welded at their point of intersection. But there are also guides with uncrossed blades of the RCC type (for "Remote Centre Compliance"), which have straight blades that do not cross each other. Such a resonator is described in document EP 2911012, or in documents EP14199039, and EP16155039.

However, when it is desired to use flexible blades to pivot a rotating annular balance in a manner similar to the movement of a balance with a spring, gravity has a significant impact on the rate of the horological movement. Indeed, the flexible guide is oriented along a main axis of symmetry, when the mechanism is at rest. Thus, if gravity is directed along this axis, its impact is very different from the case where gravity is directed in a direction perpendicular to this axis. Thus, the centre of mass of the mechanism is displaced under the effect of gravity, which causes differences in chronometric performance between different positions of the watch.

To respond to this problem, application US202003805 proposes to add an unbalance between the centre of mass and the centre of rotation along the main axis of symmetry. But unbalance weighs down the balance, which leads to adjustment problems and loss of energy.

SUMMARY OF THE INVENTION

The purpose of the present invention is to overcome all or part of the disadvantages mentioned above by providing a timepiece resonator mechanism less sensitive to the direction of gravity.

To this end, the invention relates to a rotary resonator mechanism comprising an oscillating mass, a flexible guide comprising at least two flexible blades connecting a stationary support to the oscillating mass, the resonator mechanism extending substantially in the same plane to allow the oscillating mass to perform a rotary movement around a virtual pivot, the flexible guide extending along a main axis of symmetry.

The invention is remarkable in that the mechanism comprises a translation table arranged in series between the flexible guide and the oscillating mass, the translation table being joined to the flexible blades and/or to the oscillating mass.

Thanks to the translation table, the connection between the flexible guide and the balance is more flexible. Depending on the orientation of the translation table, this flexibility will change the rate of the resonator mechanism. Thus, the rate is increased in a particular direction of the mechanism relative to gravity if the translation table adds flexibility in that direction, and the rate is decreased in a second direction perpendicular to the first direction. The translation table allows the centre of mass to be brought closer or further away from the centre of rotation of the balance under the effect of gravity. Consequently, the effect of gravity on the movement of the balance is compensated for by correcting the rate of the resonator mechanism in a particular direction relative to gravity.

Furthermore, the translation table can be used as shock-resistant protection. Thus, the translation table protects the flexible guide against a risk of breakage following a shock.

According to a particular embodiment of the invention, the translation table is arranged to allow displacement along the main axis of symmetry of the flexible guide in the rest position of the mechanism.

According to a particular embodiment of the invention, the translation table is arranged to allow displacement in a direction substantially perpendicular to the main axis of symmetry of the flexible guide in the rest position of the mechanism.

According to a particular embodiment of the invention, the translation table comprises at least two secondary flexible blades and a rigid part, the secondary flexible blades being joined at one end to the rigid part, and at another end to the balance, the blades of the flexible guide being connected to the rigid part of the translation table.

According to a particular embodiment of the invention, the secondary flexible blades are substantially parallel and disposed in different directions.

According to a particular embodiment of the invention, the two blades of the flexible guide are crossed.

According to a particular embodiment of the invention, the mechanism comprises a second translation table arranged in series between the first translation table and the flexible guide.

According to a particular embodiment of the invention, the second translation table comprises at least two tertiary flexible blades and a second rigid part, the tertiary flexible blades being joined at one end to the rigid part of the first translation table, and at another end to the second rigid part, the two blades of the flexible guide being connected to the second rigid part of the second translation table.

The invention also relates to a horological movement including such a resonator mechanism.

BRIEF DESCRIPTION OF THE FIGURES

The purposes, advantages and features of the present invention will become apparent upon reading several embodiments given only by way of non-limiting examples, with reference to the appended drawings wherein.

DETAILED DESCRIPTION OF THE INVENTION

Figure 1:
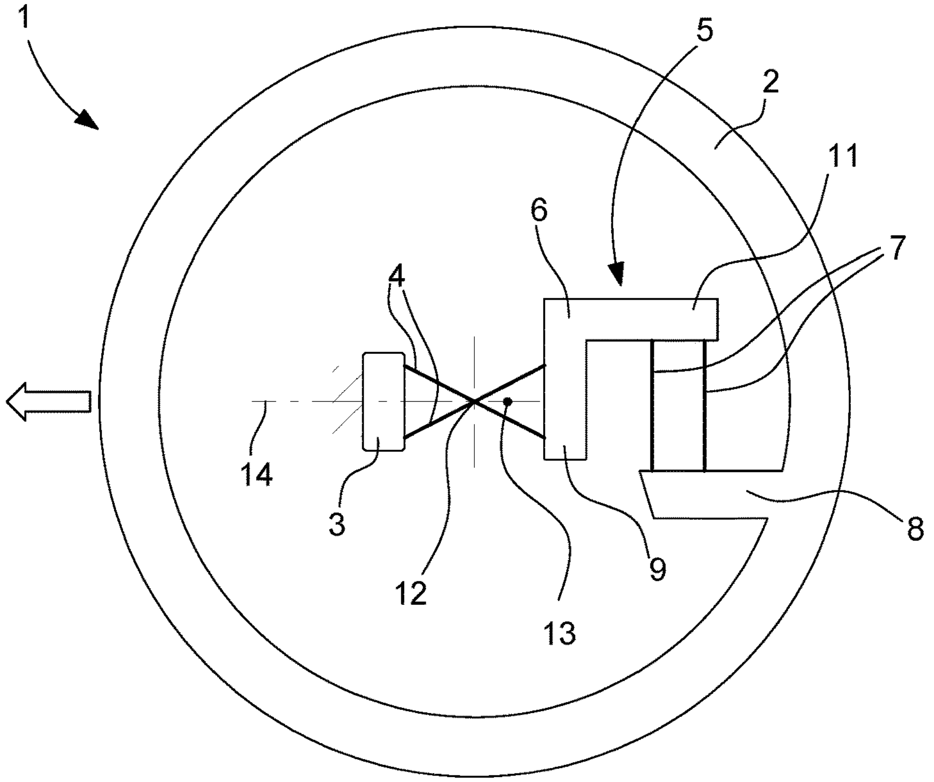
FIG. 1 schematically shows a top view of a resonator mechanism according to a first embodiment of the invention, FIG. 2 schematically shows a top view of the resonator mechanism of the first embodiment in operation, FIG. 3 schematically shows a top view of a resonator mechanism according to a second embodiment of the invention, FIG. 4 schematically shows a top view of the resonator mechanism of the second embodiment in operation, FIG. 5 schematically shows a top view of a flexible guide according to a third embodiment of the invention.
Figure 2:
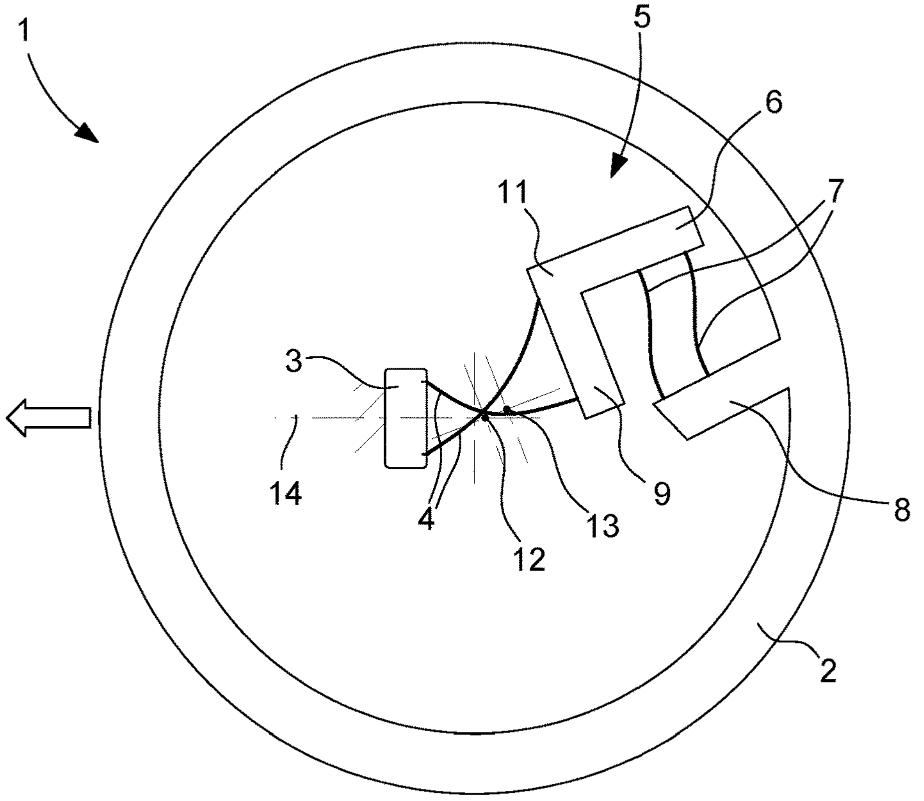

FIGS. 1 and 2 show a schematic representation of a first embodiment of a rotary resonator mechanism 1 for a horological movement. The resonator mechanism 1 extends substantially in a plane and comprises an oscillating mass 2. The oscillating mass 2 is for example an annular balance usually used in watchmaking.

The resonator mechanism 1 further comprises a flexible guide to allow the oscillating mass 2 to perform a rotary movement around a centre of rotation 12. The flexible guide comprises at least two flexible blades 4 connected to the stationary support 3. The flexible guide extends along a main axis of symmetry 14 along which the flexible guide is in the equilibrium position when it is in the rest position. The two blades 4 are crossed, one end of each blade 4 being joined to the stationary support 3. The blades 4 cross each other on the main axis 14 of symmetry when the mechanism is in the rest position. The flexible guide allows the oscillating mass 2 to perform a reciprocating rotary movement in the plane of the oscillator mechanism. FIG. 2 shows the mechanism in operation, the blades 4 of the flexible guide being curved so that the balance 2 can displace.

According to the invention, the mechanism comprises a translation table 5 arranged in series between the flexible guide and the oscillating mass 2, the translation table 5 being joined on the one hand to the two flexible blades 4 of the guide, and on the other hand to the oscillating mass 2, here to the balance. The translation table 5 comprises at least one, here two, secondary flexible blades 7 and a rigid part 6, the secondary flexible blades 7 being joined at one end to the rigid part 6, and at another end to the balance 2, the blades 4 of the flexible guide being connected to the rigid part 6 of the translation table 5. The secondary flexible blades 7 are substantially parallel and disposed in different directions.

The rigid part 6 comprises an elbow-shaped body, the rigid part 6 comprising a segment 11 substantially parallel to the main axis of symmetry 14 in the rest position of the mechanism, as well as a segment 9 substantially perpendicular to the main axis of symmetry 14 in the rest position of the mechanism 1. The secondary blades 7 are joined to the segment 11 substantially parallel to the inside of the elbow, and the blades 4 of the flexible guide 1 are joined to the segment 9 substantially perpendicular to the outside of the elbow.

The balance comprises a lug 8 extending inwardly of the ring in the plane of the balance. The lug 8 allows the attachment of the secondary flexible blades 7 on the ring in a position substantially perpendicular to the flexible guide in the rest position of the mechanism 1. In this embodiment, the two secondary blades 7 are substantially perpendicular to the main axis of symmetry 14 in the rest position of the mechanism 1.

The translation table 5 is arranged to allow additional displacement along the main axis of symmetry 14 of the flexible guide to move the centre of mass 13 of the balance closer to or away from the centre of rotation 12. As seen in FIG. 2, when the balance is moving, it forms an angle θ with the initial main axis of symmetry 14 of the flexible guide at rest. Thus, when gravity is oriented along the main axis of symmetry 14, the translation table allows to move the centre of mass 13 of the balance closer to or away from the centre of rotation 12, to increase the rate of the mechanism and compensate for the effect of gravity on the movement of the balance. The displacement is performed in the direction of gravity.

Figure 3:
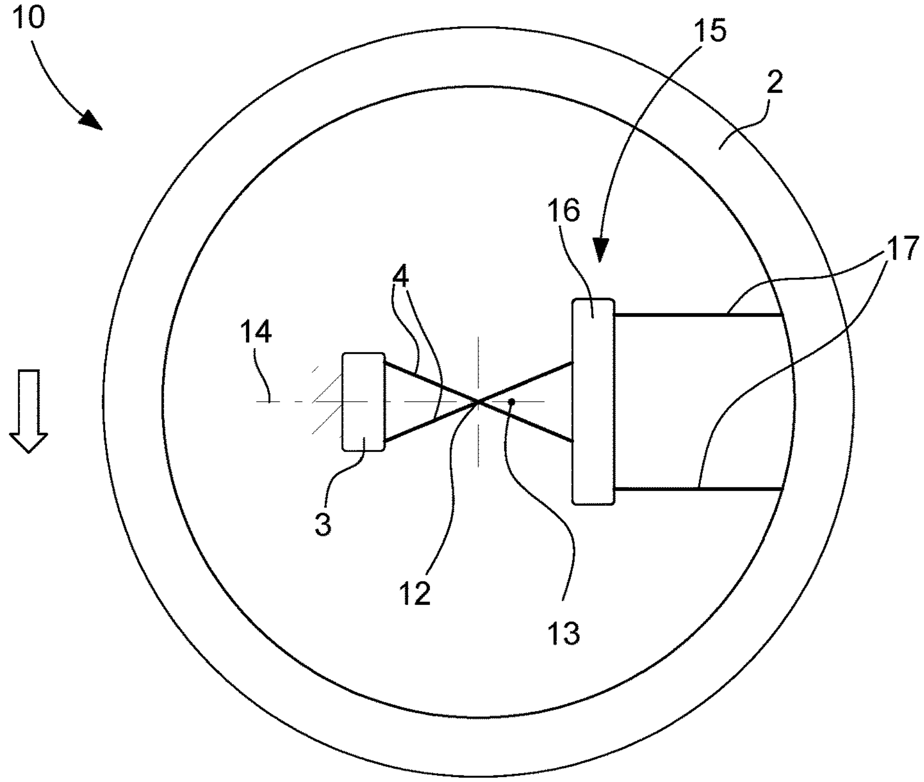
Figure 4:
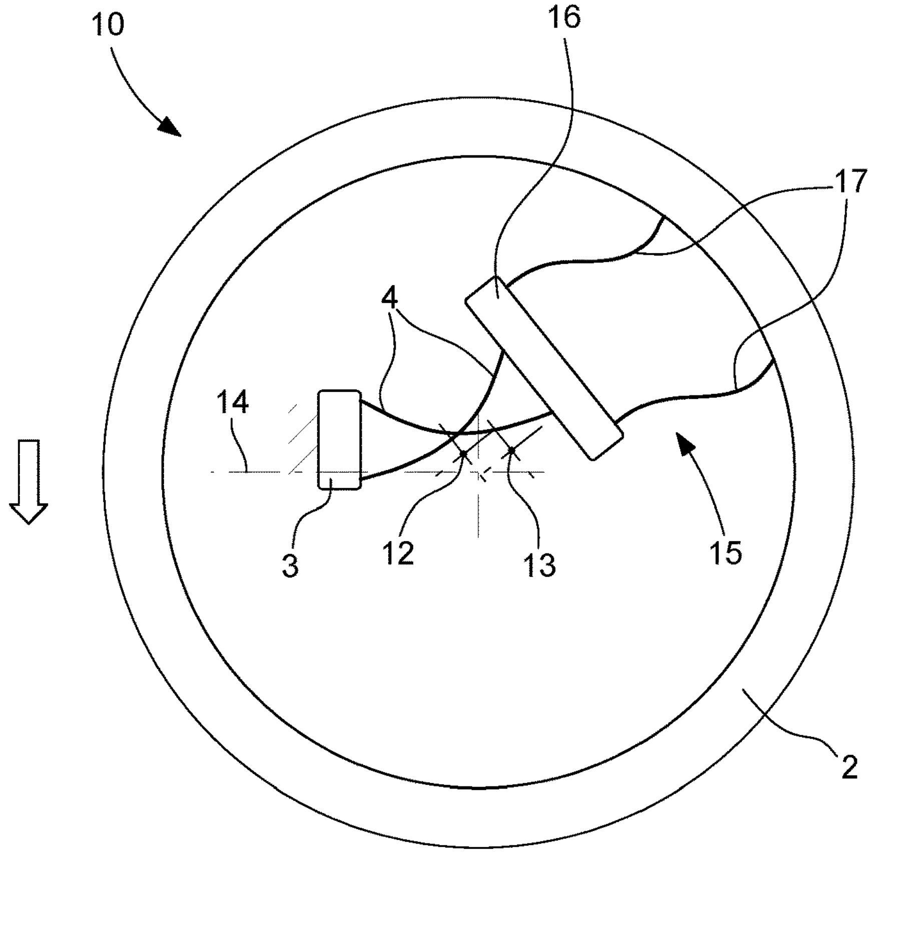

FIGS. 3 and 4 show a second embodiment of a resonator mechanism 10 according to the invention. The flexible guide and the oscillating mass 2 are identical to the first embodiment.

The resonator mechanism further comprises a translation table 15 arranged to allow displacement in a direction perpendicular to the main axis of symmetry 14 of the flexible guide. In other words, the translation table 15 is disposed perpendicularly to that of the first embodiment, and allows displacement of the flexible guide perpendicularly to the displacement of the first embodiment.

The translation table 15 comprises at least one, preferably two, secondary flexible blades 17 and a rigid part 16, the secondary flexible blades 17 being joined at one end to the rigid part 16, and at another end to the balance 2. The blades 4 of the flexible guide are connected to the rigid part 16 of the translation table 15. The secondary flexible blades 17 are substantially parallel and disposed in different directions. The secondary flexible blades 17 are directly joined to the ring so as to be substantially parallel to the flexible guide.

In this embodiment, the two secondary blades 17 are substantially parallel to the main axis of symmetry 14 in the rest position of the mechanism 10. The rigid part 16 comprises an elongated body arranged perpendicularly to the secondary flexible blades 17 and to the main axis of symmetry 14 of the flexible guide.

The translation table 5 is arranged to allow an additional displacement perpendicular to the main axis of symmetry 14 of the flexible guide to displace the centre of mass 13 of the balance relative to the centre of rotation 12. As seen in FIG. 4, when the balance is moving, it forms an angle θ with the initial main axis of symmetry 14 of the flexible guide at rest. Thus, when gravity is oriented perpendicularly to the main axis of symmetry 14, the translation table allows to move the centre of mass 13 away from the centre of rotation 12 of the balance, to increase the rate of the mechanism and compensate for the effect of gravity on the movement of the balance.

Figure 5:
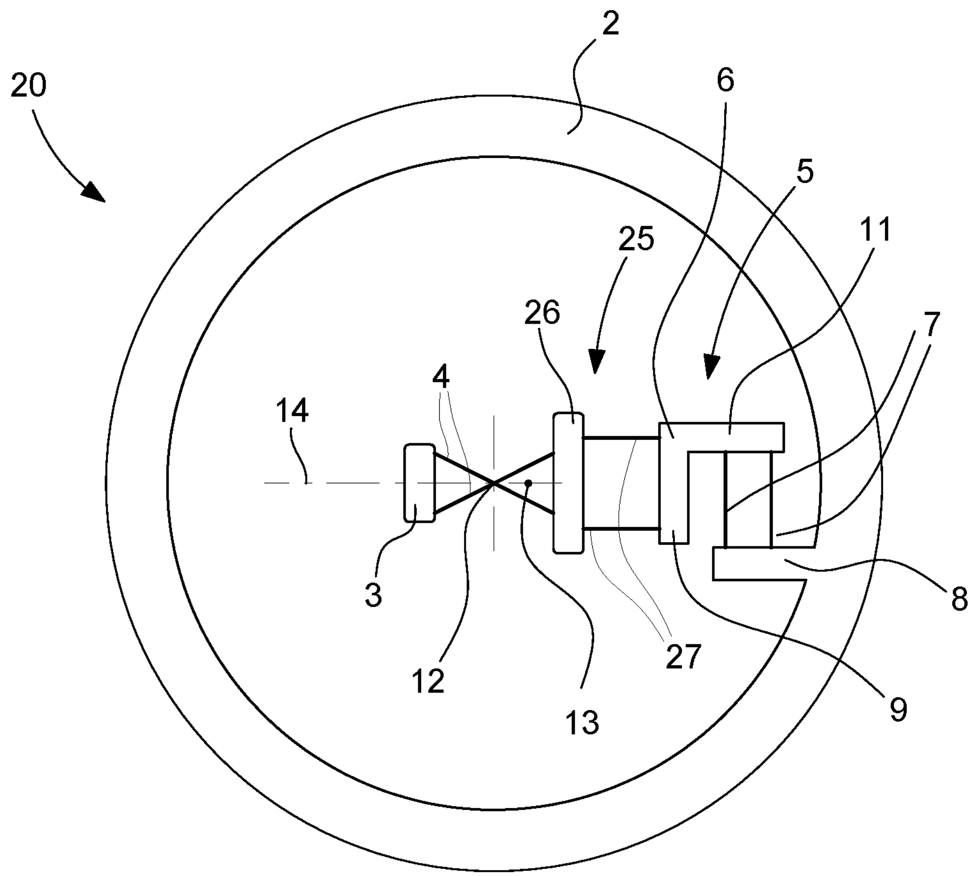

The third embodiment of FIG. 5 shows a resonator mechanism 20 comprising two translation tables 5, 25 arranged in series between the flexible guide and the oscillating mass 2. The two tables 5, 25 are substantially perpendicular to each other to allow the effects of gravity to be compensated in both directions. The first translation table 5 is arranged as in the first embodiment, and the second translation table 25 is disposed between the flexible guide and the first translation table 5. The second translation table 25 is similar to that of the second embodiment and oriented in the same direction.

The balance comprises an inner lug 8 on which the secondary blades 7 of the first translation table 5 are joined.

The second translation table 25 comprises a second rigid part 26 and a pair of tertiary blades 27 joined to the substantially perpendicular segment 9 of the first bent rigid part 6 of the first translation table 5. The crossed blades 4 of the flexible guide are joined on the one hand to a stationary support 3, and on the other hand to the second rigid part 26 of the second translation table 25. The secondary blades 7 of the first translation table 5 are joined on the one hand to the lug 8 and on the other hand to the substantially parallel segment of the rigid part 6 of the first translation table 5.

Such a combination of translation tables 5, 25 allows to modify the rigidity of the flexible guide in both directions relative to gravity as required.

In a variant embodiment, the tables are inverted relative to each other. Thus, the first translation table is arranged between the flexible guide and the second translation table, the second translation table being joined to the balance.

In another variant embodiment, one of the translation tables is oriented in a direction different from the main axis of symmetry 14 of the pivot, and which may also be different from the axis perpendicular to the main axis of symmetry 14.

The invention also relates to a horological movement, not shown in the figures, the movement comprising a rotary resonator mechanism as described above.

The invention claimed is:

1. A rotary resonator mechanism (1, 10, 20) comprising an oscillating mass (2), a flexible guide comprising at least two flexible blades (4) that cross each other at a crossing, the flexible blades connecting a stationary support (3) to the oscillating mass (2), the resonator mechanism (1, 10, 20) extending substantially in the same plane to allow the oscillating mass to perform a rotary movement around a virtual pivot, the flexible guide (1, 10, 20) extending along a main axis of symmetry (14) extending from the stationary support, through the crossing of the flexible blades and to a rigid part of a translation table at a rest position of the mechanism, wherein the mechanism (1, 10, 20) comprises the translation table (5, 15) arranged in series between the flexible guide and the oscillating mass (2), the translation table (5, 15) being joined to the flexible blades (4) and to the oscillating mass (2).

2. The resonator mechanism according to claim 1, wherein the translation table (5) is arranged to allow displacement along the main axis of symmetry (14) of the flexible guide in the rest position of the mechanism (1, 10, 20).

3. The resonator mechanism according to claim 1, wherein the translation table (15) is arranged to allow displacement in a direction substantially perpendicular to the main axis of symmetry (14) of the flexible guide in the rest position of the mechanism (1, 10, 20).

4. The resonator mechanism according to claim 1, wherein the translation table (5, 15) comprises at least two secondary flexible blades (7, 17) and the rigid part (6, 16), the secondary flexible blades (7, 17) being joined at one end to the rigid part (6, 16), and at another end to the oscillating mass (2), the blades (4) of the flexible guide being connected to the rigid part (6, 16) of the translation table.

5. The resonator mechanism according to claim 4, wherein the secondary flexible blades (7, 17) are substantially parallel.

6. The resonator mechanism according to claim 1, further comprising a second translation table (25) arranged in series between the first translation table (5) and the flexible guide.

7. The resonator mechanism according to claim 6, wherein the second translation table (25) comprises at least two tertiary flexible blades (27) and a second rigid part (26), the tertiary flexible blades (27) being joined at one end to the rigid part (6) of the first translation table (5), and at another end to the second rigid part (26), the two blades (4) of the flexible guide being connected to the second rigid part (26) of the second translation table.

8. A horological movement comprising a resonator mechanism (1, 10, 20) according to claim 1.

* * * * *